United States Patent
Khoe et al.

(10) Patent No.: US 6,884,391 B1
(45) Date of Patent: Apr. 26, 2005

(54) PHOTO-ASSISTED OXIDATION OF INORGANIC SPECIES IN AQUEOUS SOLUTIONS

(75) Inventors: Ging Hauw Khoe, Cronulla (AU); Myint Zaw, Lidcombe (AU); Patricia Salini Prasad, Guildford (AU); Maree Therese Emett, Pennant Hills (AU)

(73) Assignee: CRC For Waste Management & Pollution Control Limited, Kensington (AU)

( * ) Notice: Subject to any disclaimer, the term of this patent is extended or adjusted under 35 U.S.C. 154(b) by 0 days.

(21) Appl. No.: 09/463,423

(22) PCT Filed: Jul. 22, 1998

(86) PCT No.: PCT/AU98/00576

§ 371 (c)(1),
(2), (4) Date: Apr. 7, 2000

(87) PCT Pub. No.: WO99/05065

PCT Pub. Date: Feb. 4, 1999

(30) Foreign Application Priority Data

Jul. 23, 1997 (AU) ............................................. PO8196

(51) Int. Cl.[7] ............................. A01L 2/00; B01J 19/08; C02F 1/72
(52) U.S. Cl. ............................ 422/24; 422/1; 422/28; 422/186; 210/721; 210/748; 210/758; 210/911; 210/912
(58) Field of Search ................................. 422/1, 22–24, 422/28–29, 186, 120–121, 186.04, 186.07, 186.21, 186.3; 210/721, 748, 758, 911, 912

(56) References Cited

U.S. PATENT DOCUMENTS

| | | | | |
|---|---|---|---|---|
| 4,537,686 A | * | 8/1985 | Borbely et al. | |
| 5,120,453 A | * | 6/1992 | Frame et al. | |
| 5,238,581 A | * | 8/1993 | Frame et al. | |
| 5,573,676 A | * | 11/1996 | Massholder et al. | |
| 5,688,378 A | * | 11/1997 | Khoe et al. | |

FOREIGN PATENT DOCUMENTS

| | | | |
|---|---|---|---|
| AU | 14405/97 A1 | 7/1997 | |
| DE | 41 09 872 A1 | 10/1992 | |
| DE | 19 646 555 A1 | 4/1998 | |
| EP | 07 59 411 A1 | 2/1997 | |
| WO | WO 95/11195 | * 4/1995 | ........... C01B/25/12 |

OTHER PUBLICATIONS

Matthews, J. H. et al., J. Am. Chem. Soc. 1917, 39, 635. (to follow).

Japanese Abstract, No. 98–211144/19, JP 10057973 A issued to Mitsui Toatsu Chemical, Inc. dated Mar. 3, 1998.

* cited by examiner

Primary Examiner—Robert J. Warden, Sr.
Assistant Examiner—Monzer R. Chorbaji
(74) Attorney, Agent, or Firm—Davis & Bujold P.L.L.C.

(57) ABSTRACT

A method for oxidizing an inorganic species in an aqueous solution comprises the steps of: (i) supplying an oxidizable source of sulphur, and oxygen to the solution; and (ii) irradiating the solution with UV light such that both the inorganic and sulphur species are oxidized.

8 Claims, 10 Drawing Sheets

PHOTO-ASSISTED OXIDATION OF INORGANIC SPECIES IN AQUEOUS SOLUTIONS

FIELD OF THE INVENTION

The present invention relates to a method for oxidising inorganic species in aqueous solutions, and more particularly, to the treating of contaminants in e.g. human drinking water, and industrial waste waters and process liquors. However, it should be appreciated that the invention can be employed wherever it is necessary to oxidise an inorganic species in aqueous solutions for whatever reason.

BACKGROUND TO THE INVENTION

Dissolved sulphur dioxide or sulphite is usually considered to be a reducing agent. Further, it is known that the oxidation of sulphite is accelerated through exposure to UV radiation (Matthews, J. H. et.al. J. Am. Chem. Soc. 1917,39, 635). Matthews teaches, however, that oxidation is retarded by the presence of trace amounts of various species. In addition, no change in the oxidation state of these species was observed.

Many drinking water supplies across the world are contaminated by trace contaminants including arsenic, iron and manganese. World Health Organisation standards require very low levels of contaminants (for example arsenic-a 10 ppb limit). The presence of manganese gives rise to "dirty water" problems and can result in soiling of clothes and staining of household fixtures when present in concentrations in excess of 20 ppb in drinking water.

Many waste waters and mineral processing liquors from industry also include arsenic, iron, manganese and cerium, and in the field of nuclear technology, uranium.

As part of the removal process, chemical oxidants such as chlorine, ozone and permanganate are often used. However, these oxidants can give rise to harmful byproducts such as chloroform, and the presence of residual permanganate can produce discoloured waters.

SUMMARY OF THE INVENTION

The present invention provides a method for oxidising an inorganic species in an aqueous solution comprising the steps of:

(i) supplying an oxidisable source of sulphur, and oxygen to the solution; and (ii) irradiating the solution with UV light such that the species is oxidised.

In the present invention, oxygen is advantageously used as the oxidising agent, with no residual contaminating after-effects. Sulphur sources can be selected, (e.g. sulphite) such that in the oxidising procedure, a relatively benign product is produced (e.g. sulphate). Although the final product of using sulphite is a relatively benign dissolved sulphate, it is preferable to use it sparingly especially if an ion-exchange process is subsequently used to remove the contaminant (e.g. arsenic). In this case dissolved sulphate of no more than 25 mg/L is preferred in order to obtain effective arsenic(V) removal (sulphate and arsenate compete for sites on the ion-exchange material).

The oxidisable sources of sulphur can be $SO_3^{2-}$, $S_2O_3^{2-}$, $S_4O_6^{2-}$, $SO_2(g)$, aqueous $SO_2$, or $HSO_3^-$. However, sulphur dioxide and sulphite are preferred sources.

Typically the process is applied in the treatment of trace quantities of inorganic species but the process can also find application with more concentrated quantities of contaminants.

Typically the species oxidised includes one or more of arsenic, manganese, cerium and/or iron.

Typically the ultraviolet light employed has a wavelength of about 254 nm. Radiation can be supplied continuously or in pulses. Furthermore, low, medium or high pressure mercury arc lamps can be used as the source of the UV radiation. It was also noted that UV wavelengths of 254 nm from a lamp source advantageously disinfected water so treated.

Typically the oxygen is sparged into the aqueous solution as air but other methods of addition are possible. As indicated above, the solution is typically a drinking water solution, an industrial waste water or process liquor etc.

Typically the pH of the solution is, if necessary, adjusted to be approximately neutral or basic.

BRIEF DESCRIPTION OF THE DRAWINGS

Notwithstanding any other forms which may fall within the scope of the present invention, preferred forms of the invention will now be described, by way of example only, with reference to the accompanying drawings and the following non-limiting examples. In the drawings.

MODES FOR CARRYING OUT THE INVENTION

Preferred forms of the present invention find application in the treatment of drinking water, waste waters and mineral processing liquors. It should be appreciated, however, that the invention has broader applications.

With drinking water treatment, it is desirable to remove trace oxidisable contaminants, such as arsenic and manganese. In at least preferred forms, contaminants are oxidised and then removed under neutral or slightly alkaline conditions.

In the treatment of waste waters and mineral processing liquors, it is desirable to neutralise and/or remove (depending on the final use of the water or liquor) species such as arsenic, iron and manganese. In these applications, however, oxidation may take place in acid, neutral or alkaline conditions.

Manganese-related "dirty water" problems are a significant water quality issue to water supply authorities. It is understood that 40 percent of public water supplies in the United States have manganese concentrations exceeding levels of 10–20 ppb.

Manganese is also a problem in processed wastes in the milling of uranium ores and in acid mine drainage. Manganese is often present in the ore to be milled, and may be also introduced as an oxidant in the form of a pyrolusite ($MnO_2$) which is an oxidant used in the leaching of uranium.

In industrial process liquors, it is necessary to oxidise various metal ions as part of the overall processing in the plant.

Details of various preferred process operating parameters are now described.

Source of Radiant Energy

Any source of radiant energy in the UV region of the electromagnetic spectrum was observed to be useful, provided that the radiation was absorbed by the dissolved sulphur compound which was acting as the photo-initiator of the process. Low pressure mercury arc lamps were used for the oxidation of dissolved arsenic(III), manganese(II), iron (II) and cerium(III). Typical UV wavelengths of less than 300 nm were employed (preferably about 254 nm).

Choice of Photo-Absorber

Dissolved sulphur species absorbed the supplied UV light and were oxidised by dissolved oxygen. These sulphur species were used up (oxidised) during the photochemical reaction. Dissolved sulphur(IV) species derived from the addition of sodium sulphite included $SO_3^{2-}$, $HSO_3^-$ or $H_2SO_3$ depending on the pH value of the solution. The same dissolved sulphur species were obtained by dissolving $SO_2$ gas in water which gives aqueous $SO_2$ which, in turn, converted to sulphurous acid ($H_2SO_3$). Sulphorous acid dissociated to $HSO_3^-$ and $SO_3^{2-}$ at higher pH conditions. Dissolved sulphite from sodium sulphite was used for the oxidation of manganese(II).

Other partially oxidised sulphur species (sulphur(VI) as in sulphate compounds having fully oxidised sulphur species) obtained from the dissolution of sodium thiosulphate or sodium tetrathionate were also used as the photo-absorber.

Furthermore, dissolved sulphite was obtained by sparging sulphur dioxide gas or a gas mixture of sulphur dioxide and air/oxygen/nitrogen into the solution. Thus, the forms of sulphur employable included $SO_3^{2-}$, $SO_{2(g)}$, aqueous $SO_2$, $HSO_3^-$, $S_2O_3^{2-}$ and $S_4O_6^{2-}$.

Source of Oxidant

Oxygen was the oxidant for the photochemical oxidation process. It was typically supplied at about 0.2 atmospheres partial pressure by aerating the reaction mixture. Alternatively, oxygen was supplied by sparging a gas mixture of sulphur dioxide with air, or an oxygen/nitrogen mixture into the solution (or any other compatible gas source). Oxygen partial pressures greater than or less than 0.2 atm can also be used as appropriate.

Illumination was achieved by placing a lamp within a quartz envelope inside the reaction vessel (alternatively, the light can be directed from above the solution). Types of lamp used included a high or low pressure mercury arc lamp or a xenon arc lamp.

It was noted that where the UV source chosen emitted light at a wavelength at about or below 190 nm, ozone was generated from the dissolved oxygen; (ozone is a powerful oxidant which can oxidise arsenic(III) and manganese(II)). For the examples described below, non-ozone producing lamps were employed.

EXAMPLES

Non-limiting examples will now be described.

Photo-Oxidation of Dissolved Arsenic(III)

A reaction mixture (1700 mL) containing 470 µg/L As(III) (typical concentrations in ground water in areas where arsenic is leached from the naturally occurring arsenic-containing minerals) and 10 mg/L of dissolved sulphite ($SO_3^{2-}$) was prepared as follows: the sulphite stock solution was prepared by dissolving sodium sulphite salt in demineralised water; the arsenious acid (As(III)) solution was obtained by dissolving arsenic trioxide in warm, demineralised water. The pH of the reaction mixture was adjusted to 9 with the addition of sodium carbonate (because groundwaters typically have significant carbonate alkalinity). The solution was then aerated by the injection of fine bubbles of air.

Figure 1:
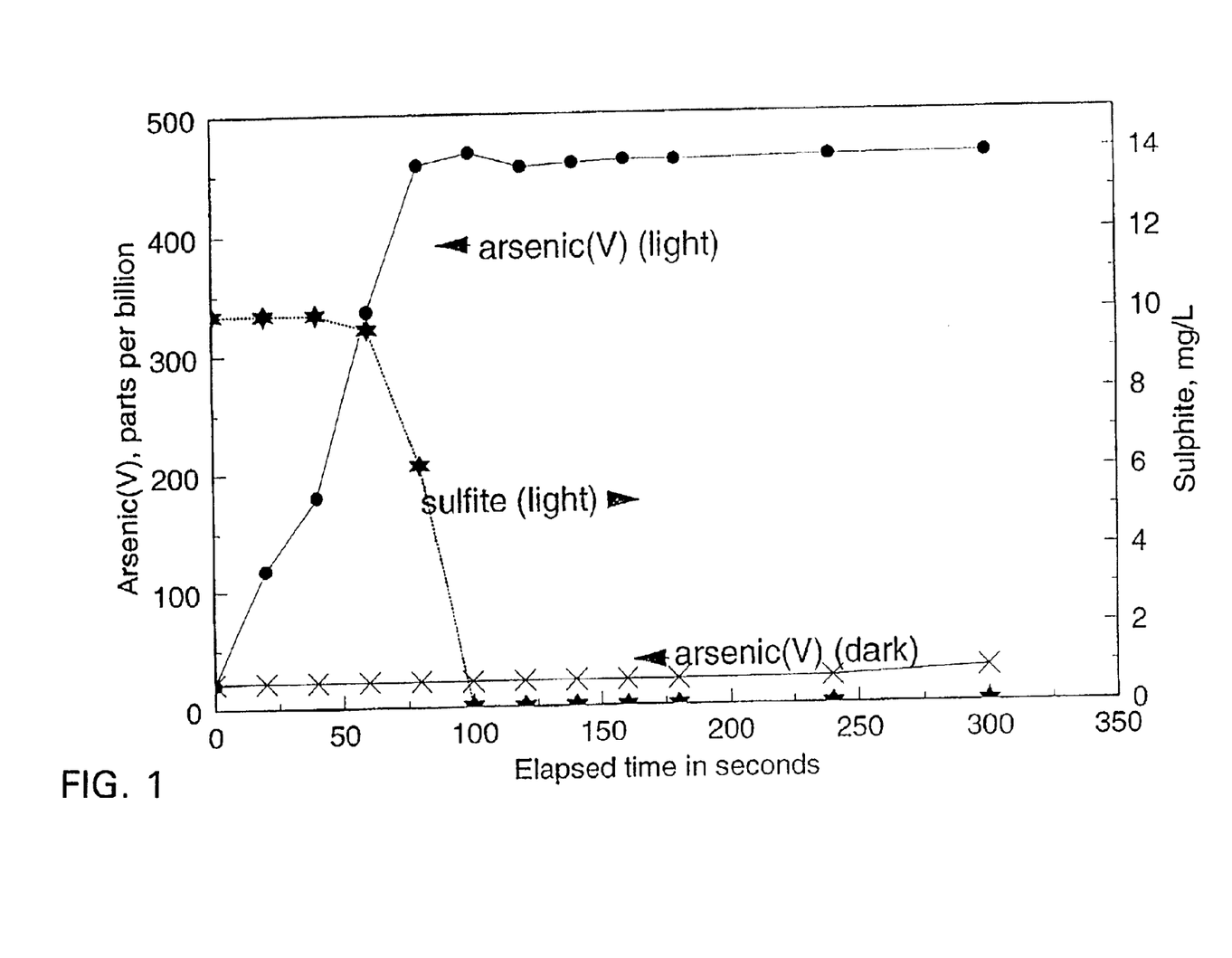
FIG. 1 is a graph that plots the increase in arsenic(V)-concentration and concomitant decrease in sulfite-concentration as a function of illumination time using a 15 W low-pressure mercury lamp. The corresponding change in arsenic(V) concentration in darkness is also shown. (Initial conditions: 1.7 liter of solution containing 470 ppb arsenic (III) in the presence of 10 mg/L sulfite, solution pH adjusted to 9 using sodium carbonate).

In the absence of UV illumination, no significant oxidation of As(III) was observed (FIG. 1). When a 15 W low pressure mercury lamp was switched on to illuminate the reaction mixture, the oxidation of As(III) and S(IV) proceeded rapidly (FIG. 1).

Figure 2:
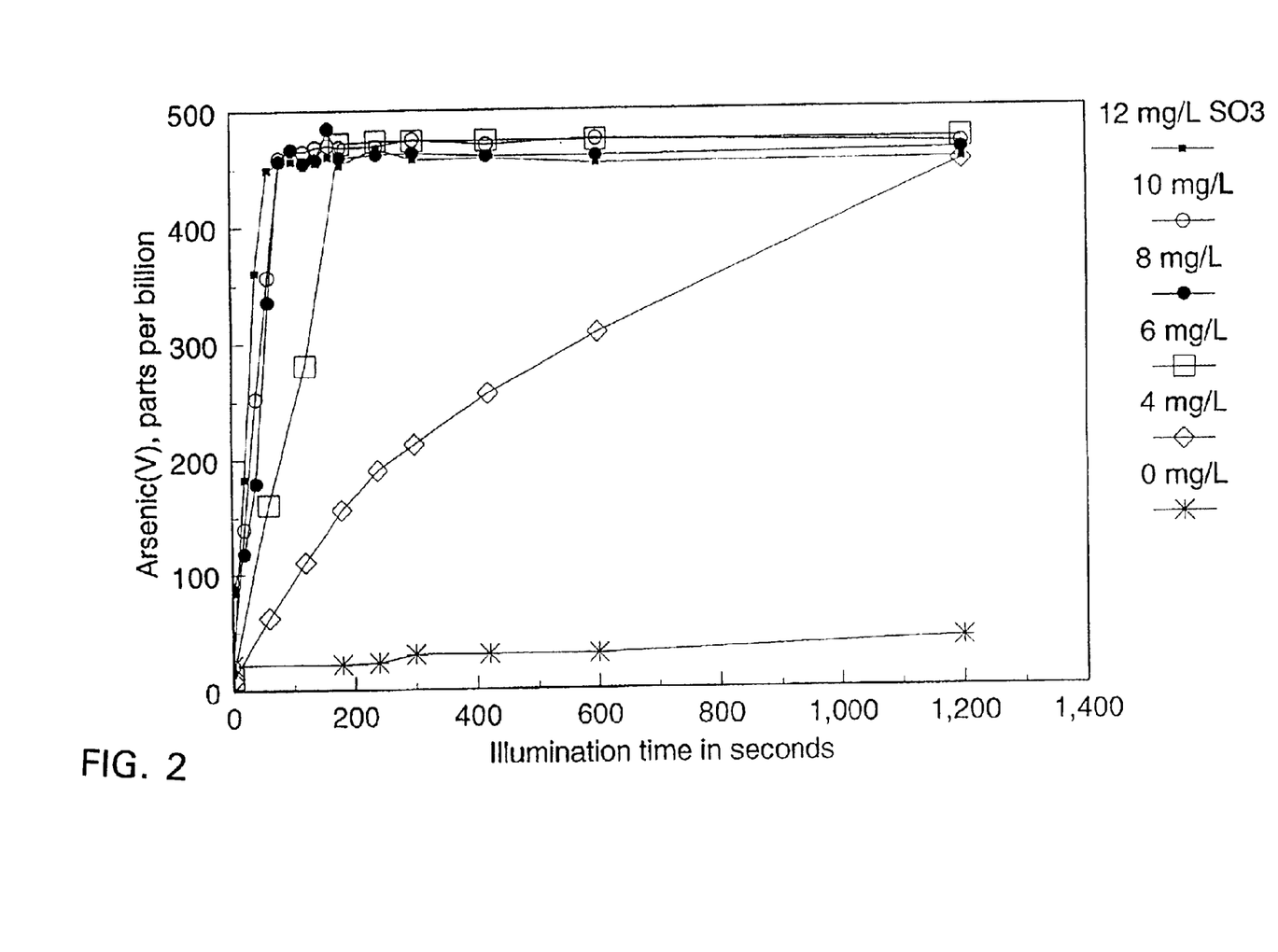
FIG. 2 is a graph that plots the increase in arsenic(V) concentrations as a function of illumination time using a 15 W 254 nm lamp. (Initial conditions: 1.7 liter of solution containing arsenic(III) concentration of approximately 470 ppb, pH adjusted to 9 using sodium carbonate, initial sulfite concentrations varied from 0 to 12 mg/L).

The experiments were repeated using various initial concentrations of dissolved sulphite, namely from 0 to 12 mg/L of dissolved sulphite. As shown in FIG. 2, the rate of As(III) oxidation was strongly dependent on the initial sulphite concentration when it was less than 8 mg/L. FIGS. 1 and 2 demonstrate that both UV light and dissolved sulphite were needed for the photo-oxidation reaction to occur.

Figure 3:
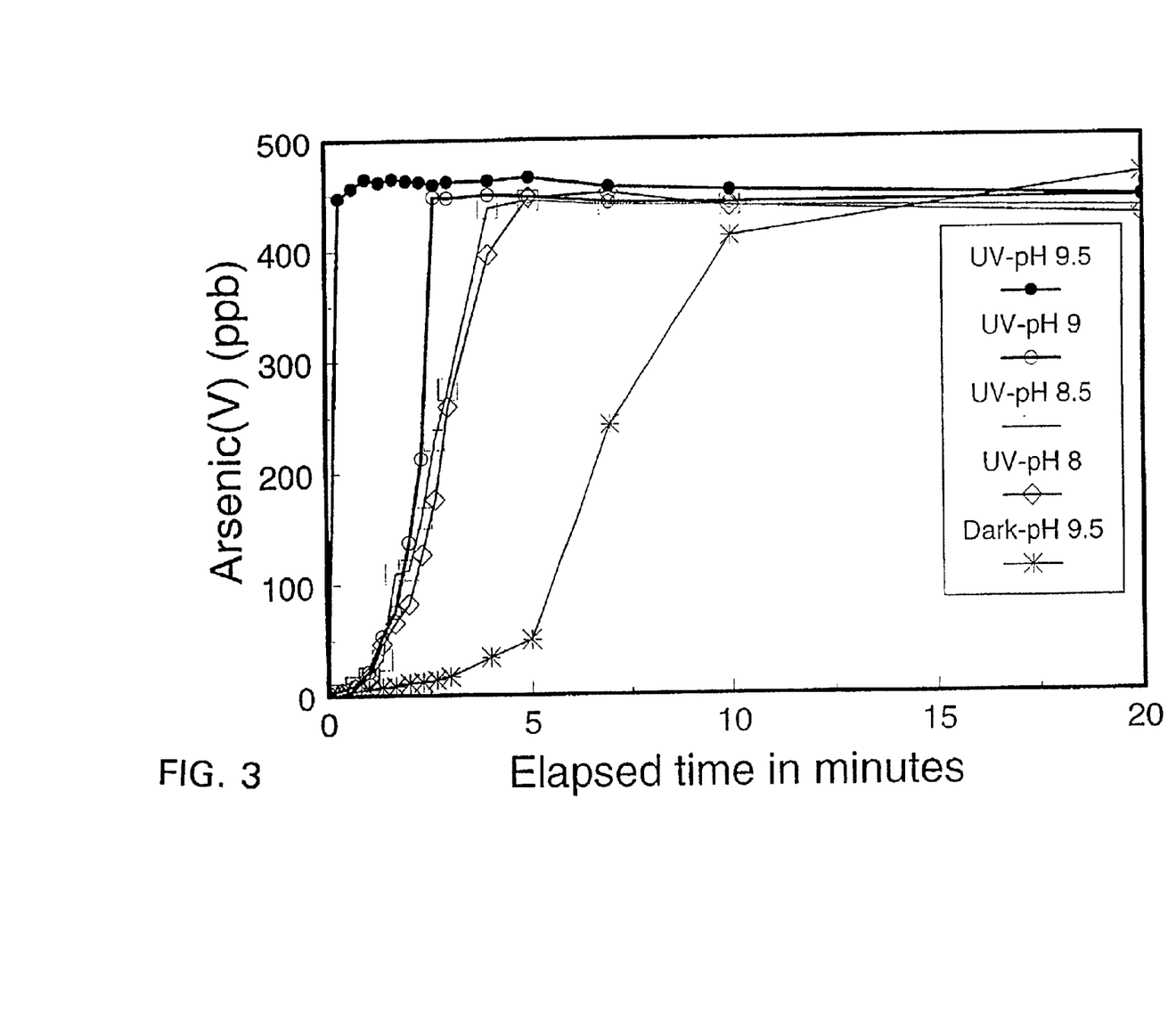
FIG. 3 is a graph that plots arsenic(V) concentrations as a function of elapsed time when solutions (1.7L) containing arsenic(III) at a concentration of 470 ppb, at various controlled pHs, were illuminated with a 15 W 254 nm lamp. Sodium sulphite solution was added at a dose rate of 2 mg/L/min and air was sparged at a rate of 2.5 L/min. Data with no UV illumination (dark) are also shown.

FIG. 3 shows that the arsenic oxidation rate was increased by the increase in the solution pH. During these test runs, the solution pH was controlled at the selected value using an automatic titrator which added sodium hydroxide solution when required. Sodium sulphite was added by the continuous injection of a stock solution (17 g/L of sulphite) at a precisely controlled flow rate using a titrator in order to give a dose rate of 2 mg/L i.e. 0.2 mL/min of the stock solution was injected into the 1.7 L of reaction mixture. This method of sulphite dosing is more efficient than the procedure described for FIGS. 1 and 2 where the sodium sulphite was added in a single dose. It also simulates the procedure where $SO_2$ gas is used. Air was sparged at a rate of 2.5 L/min.

Figure 4:
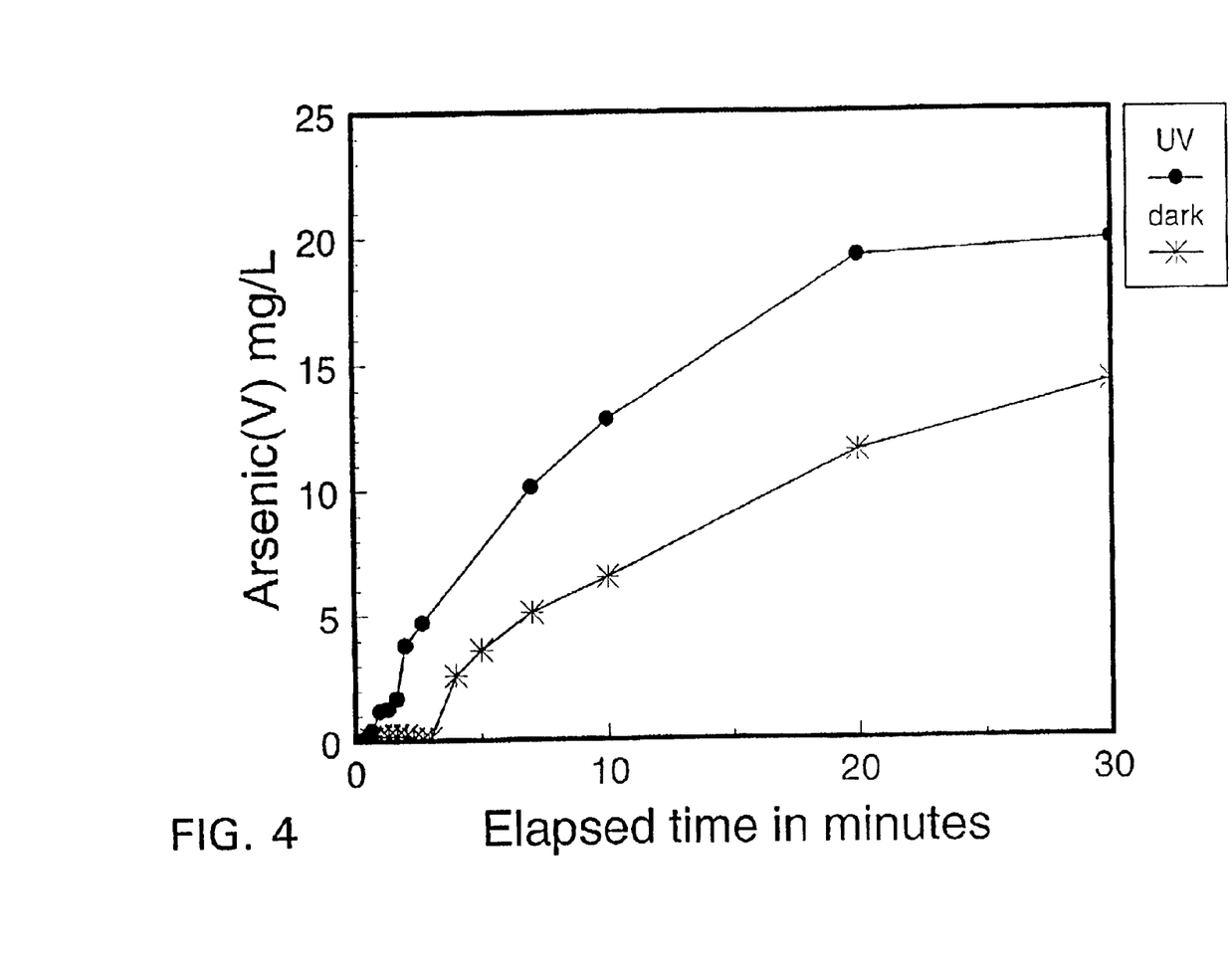
FIG. 4 is a graph that plots arsenic(V) concentrations as a function of elapsed time when a solution (1.7L) containing arsenic(III) at a concentration of about 20 mg/L, at pH 6.5, was illuminated with a 15 W 254 nm lamp. Sulphur dioxide gas was injected at a rate of about 0.02 L/min and air was sparged at a rate of 2.5 L/min. Data with no UV illumination (dark) are also shown.

Sulphur dioxide gas was used instead of sodium sulphite as shown in FIG. 4. Arsenic(III) was oxidised when sulphur dioxide and air was bubbled in the absence of UV illumination (auto oxidation process). However, the oxidation rate was accelerated when the reaction mixture was illuminated. It was observed that significant concentrations of dissolved sulphite were present in the reaction mixture indicating that an excess sulphur dioxide was sparged. Hence, the difference between the results of the 'light' and 'dark' experiments was not large as could be achieved.

Figure 5:
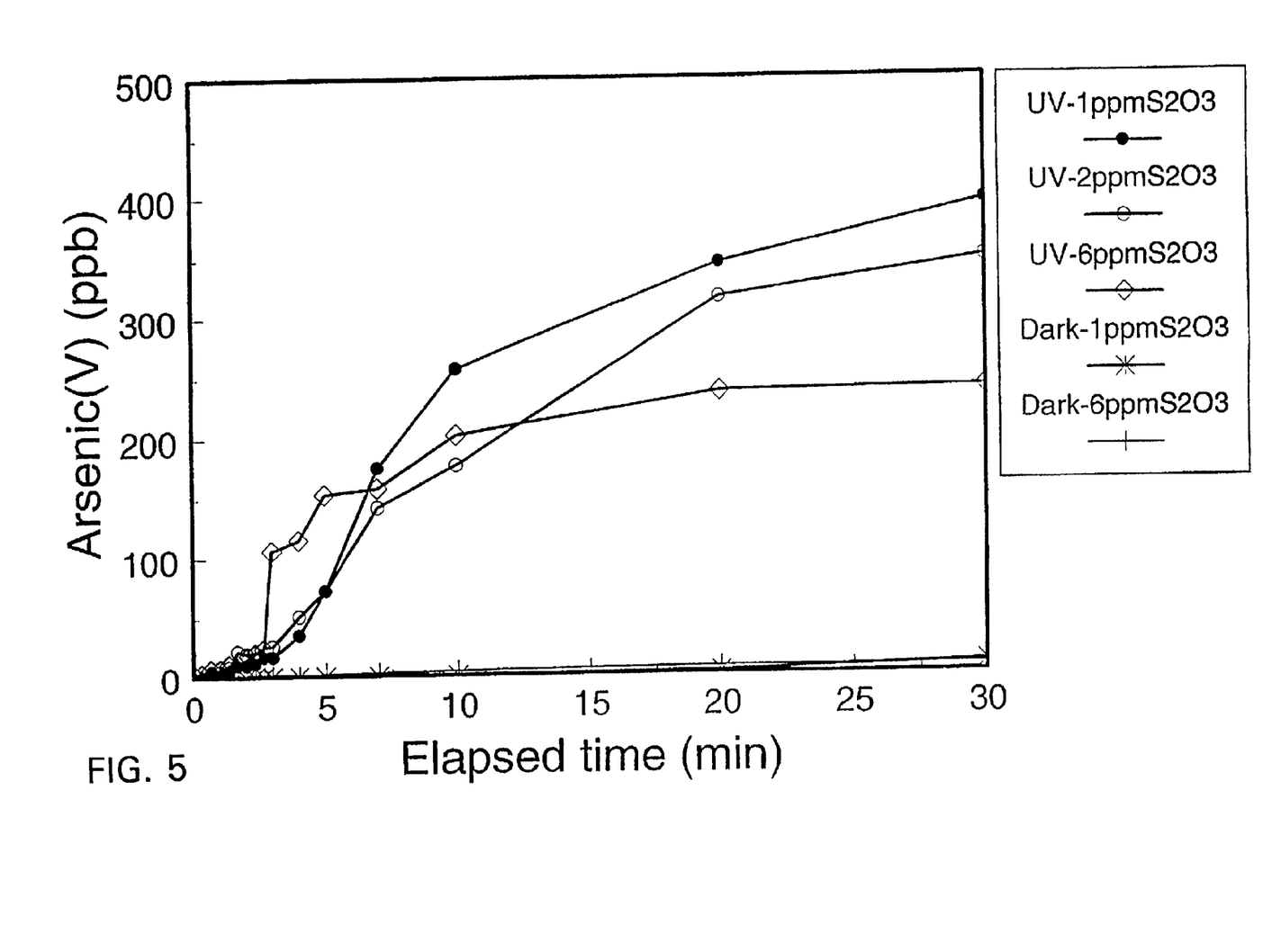
FIG. 5 is a graph that plots arsenic(V) concentrations as a function of elapsed time when solutions (1.7L) containing arsenic(III) concentration of 470 ppb, at pH 6.5, were illuminated with a 15 W 254 nm lamp. Sodium thio-sulphate solution was added at various dose rates (in mg/L/min) and air was sparged at a rate of 2.5 L/min. Data with no UV illumination (dark) are also shown.
Figure 6:
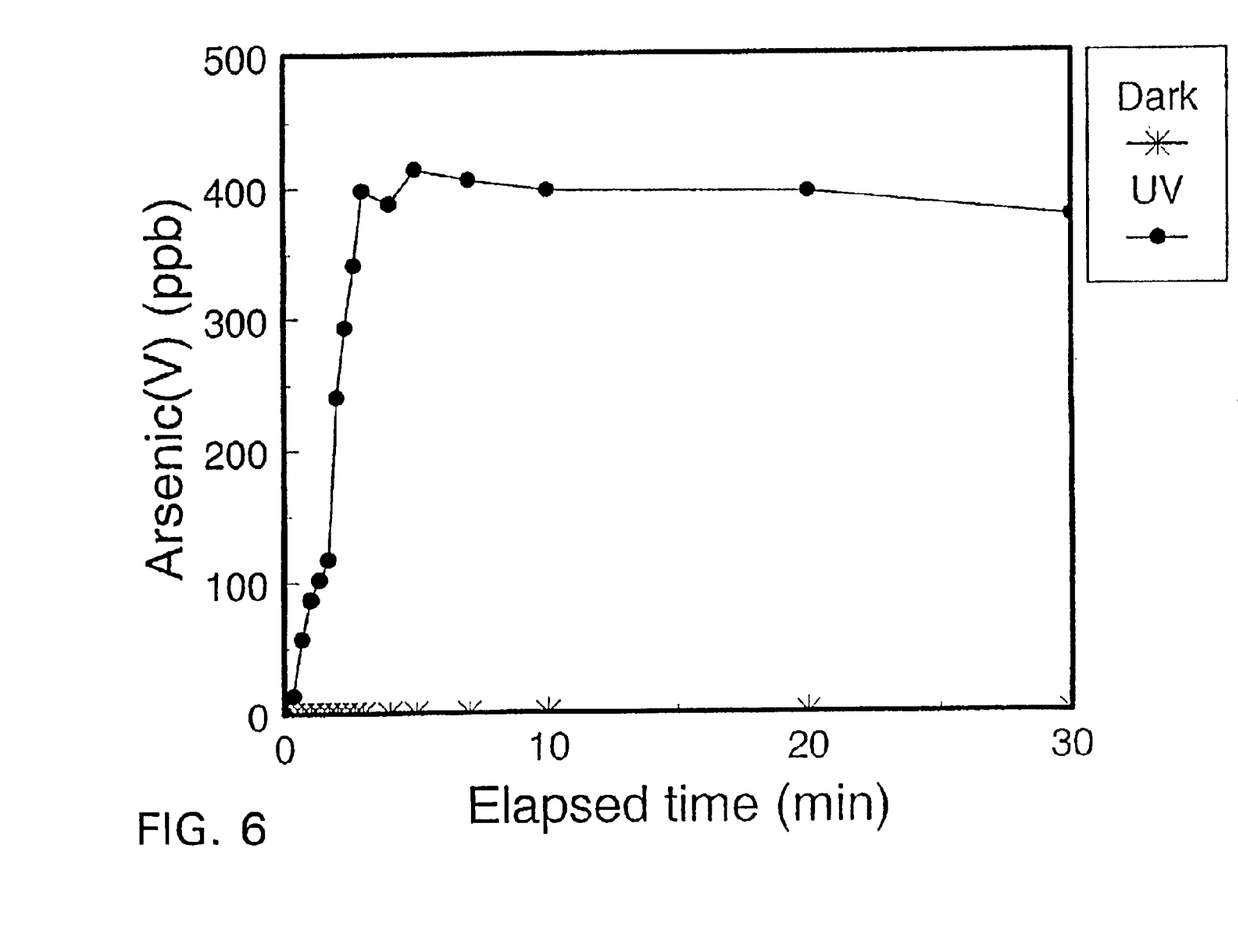
FIG. 6 is a graph that plots arsenic(V) concentrations as a function of elapsed time when a solution (1.7L) containing arsenic(III) at a concentration of 470 ppb, at pH 6.5, was illuminated with a 15 W 254 nm lamp. Sodium tetra-thionate solution was added at a dose rate of 2 mg/L/min and air was sparged at a rate of 2.5 L/min. Data with no UV illumination (dark) are also shown.

Sodium thiosulphate can be substituted for sodium sulphite as shown in FIG. 5. Similarly, sodium tetrathionate was used as the photo-absorber as demonstrated in FIG. 6.

Actinometry determination using potassium ferrioxalate showed that a maximum of 6 Watts of 254 nm radiation produced by the 15 W lamp was absorbed by the reaction mixture. Total As and As(III) concentrations were determined using atomic absorption spectroscopy with hydride generation. Concentrations of As(V) in the reaction mixture were determined using the molybdenum blue spectrophotometric method (Johnson D. and Pilson M., Analytical Chimica Acta, 58, 289–299 (1972)). Sulphite concentrations were also determined spectrophotometrically (Humphrey R. E., Ward M. H. and Hinze W., Analytical Chemistry, 42, 698–702 (1970)).

Photo-Oxidation of Dissolved Manganese(II)

A reaction mixture (1700 mL) containing 500 µg/L Mn(II) (typical concentrations in surface and ground water are less than 1 mg/L) and 10 mg/L $SO_3^{2-}$, was prepared as follows: the sulphite stock solution was prepared by dissolving sodium sulphite salt in demineralised water; the MN(II) stock solution was obtained by dissolving $MnSO_4.4H_2O$ in demineralised water. The pH of the reaction mixture was 6.5 and it was aerated by the injection of fine bubbles of air.

After a 15 W low pressure mercury lamp was switched on to illuminate the reaction mixture for 2 minutes, the reaction mixture became cloudy because of the appearance of grey/black suspended particles indicating that an oxide of manganese had been formed. A 25 mL sample was collected and its pH (4–5) was adjusted to 7 using dilute sodium hydroxide solution in order to coagulate colloidal manganese oxide particles. After 30 minutes, to allow the precipitated grey/black particles sufficient time to coagulate, the sample was filtered using an Amicon unit fitted with 0.025 µm membrane. The dissolved Mn concentration in the filtrate was 22 µg/L. This indicates that most of the dissolved Mn(II) was oxidised to Mn(III)/Mn(IV) and precipitated as manganese oxide (which is black).

When the same procedures were repeated without illumination, the reaction mixture remained clear and colourless. A sample was taken after 30 minutes and subjected to the coagulation and filtration procedure. The manganese concentration in the filtrate was 505 ppb (Table 1).

Dissolved manganese concentrations were analysed using ICP-MS, ICP-AES or atomic absorption spectroscopy with a graphite furnace.

The results of one SUCH procedure are summarised in Table 1.

TABLE 1

Residual manganese concentration in water after filtration. Concentration in parts per billion

| | |
|---|---|
| Initial Concentration | 511 ppb |
| After 2 min illumination at pH 6.5 in the presence of 10 mg/L sulfite | 22 ppb |
| After 30 minutes without illumination | 505 ppb |

Photo-Oxidation of Other Dissolved Compounds

The above procedures can also be employed with the photo-oxidation of dissolved compounds such as Se(IV), $CN^-$, Fe(II), Ni(II), V(IV), U(IV), and Ce(III). Oxidation can be demonstrated by making up a reaction mixture containing an appropriate concentration of one or more of these compounds. Dissolved sulphur species can be obtained from stock solution which can be prepared by dissolving either the equivalent sodium or calcium salt in water. The mixture can then be divided into three portions for a set of three tests:

1. No UV illumination. To the first portion of the reaction mixture, an appropriate amount of sulphite or sulphide is added from a concentrated stock solution. The mixture is aerated with a nitrogen-oxygen mixture of known oxygen partial pressure. Speciation of the oxidation state of the target substance and the sulphur at several time intervals was used to determine the reaction rate.
2. The second portion of the reaction mixture is aerated with the same oxygen/nitrogen gas mixture used in Test 1 and illuminated without the addition of a sulphur compound.
3. The final portion is aerated with the same addition of sulphite or sulphide as used in Test 1 and the light was then turned on to start the experiment. The oxidation rate is determined as above for As(III) and Mn(II).

Illumination can be achieved by placing a lamp either within an envelope inside the reaction vessel or such that the light radiates from above. Types of lamps used can include a high or low pressure mercury arc lamp, a Xenon arc lamp or a blacklight blue fluorescent tube.

It would be observed that the rate of oxidation of the target substance in Test 3 is greater than that in either Tests 1 or 2.

Procedure for Experiments Using Sulphur Dioxide Gas

The photo-oxidation reaction can proceed just as well when sulphur dioxide gas is used instead of sulphite salt. In order to demonstrate this, for each target substance, a set of three tests can be performed as in the previous section. The reaction mixture can be sparged with a fine stream of gas bubbles. The partial pressure of oxygen, sulphur dioxide and nitrogen can be independently varied in the gas stream from 0 to 100%.

Test A Sulphur dioxide is added to the oxygen/nitrogen gas stream at a known partial pressure, in the absence of any illumination, and the rate of oxidation was determined by speciating the oxidation state of the target substance after several time intervals.

Test B The vessel is designed so that the second portion of the reaction mixture was illuminated with light from a lamp, in the absence of sulphur dioxide. The slow background oxidation rate (if any) is determined by speciating the target substance for oxidation state at several time intervals.

Test C The third portion of the reaction mixture is placed in the reaction vessel. Sulphur dioxide was added to the gas stream and the lamp is switched on at the same time, to mark the beginning of the experiment. The sulphur dioxide partial pressure is the same as that in Test A and the illumination source and lamp intensity were the same as that in Test B.

The rate of oxidation of the target substance in Test C would be greater than that in Tests A or B.

The pH of the reaction mixture and the addition of sodium sulphite solution were controlled using automatic titrators as described above. The oxidation of manganese was evidenced by the appearance of grey/black suspended particles indicating that an insoluble oxide of manganese(III) or (IV) had been formed. Preliminary measurements using electron paramagnetic resonance spectroscopy confirmed that the concentration of dissolved Mn(II) decreased with the elapsed time of illumination.

Figure 7:
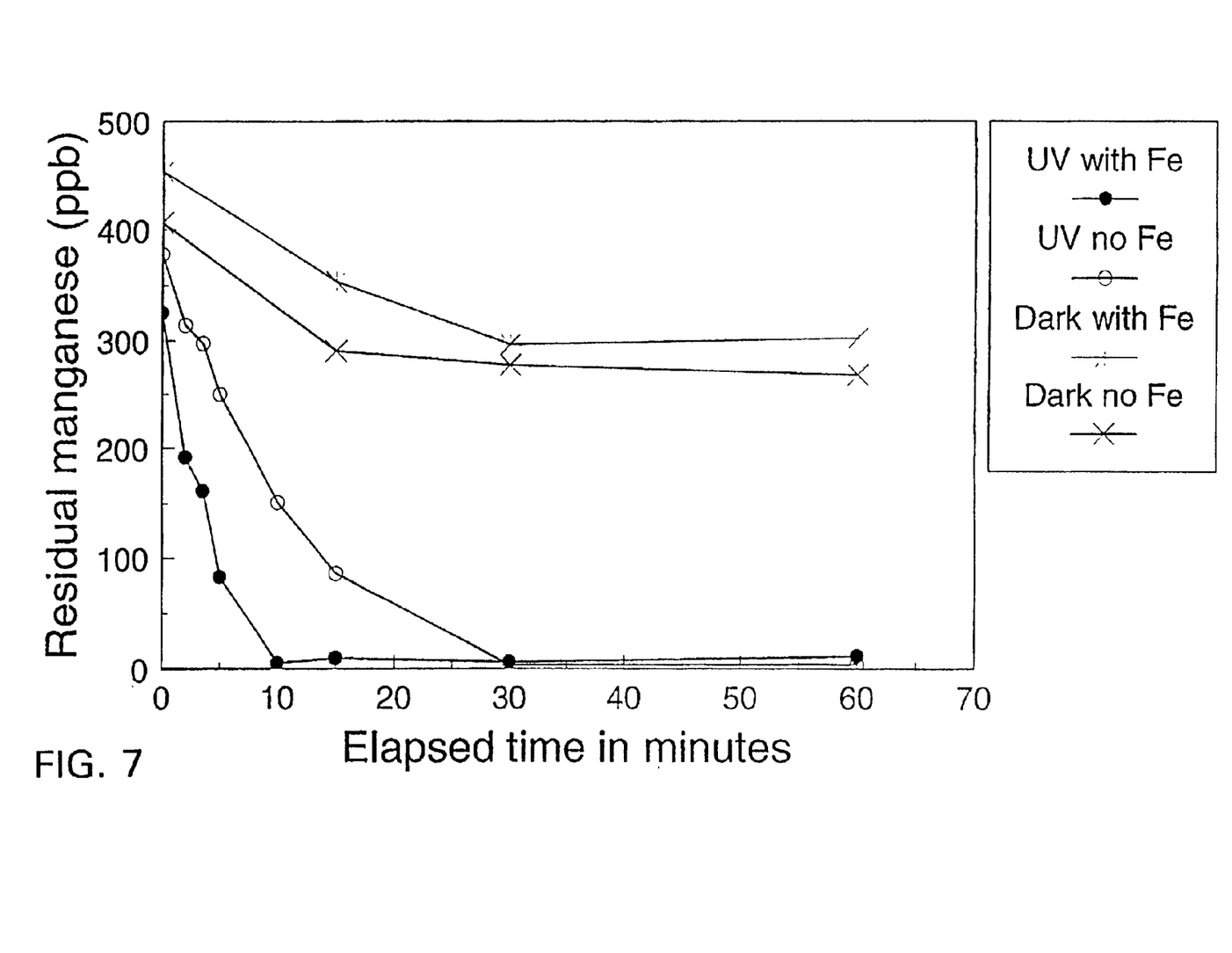
FIG. 7 is a graph that plots residual manganese concentrations as a function of elapsed time when solutions (1.7L) containing manganese(II) concentration of about 500 ppb, at pH 8.5, were illuminated with a 15 W 254 nm lamp. Sodium sulphite solution was added at a dose rate of 2 mg/L/min and air was sparged at a rate of 2.5 L/min. The oxidised manganese was removed using a 0.025 micron membrane filter. To facilitate manganese removal, ferric chloride (6.2 mg Fe/L) was added in 2 of the 4 tests. Data with no UV illumination (dark) are also shown.

The precipitated manganese particles were removed using an Amicon unit fitted with 0.025 micron membrane filter. As shown in FIG. 7, the addition of ferric chloride solution to give a concentration of about 6 mg Fe/L in the reaction mixture improved the removal of manganese from solution. The residual manganese concentrations were analysed using ICP-MS, ICP-AES or atomic absorption spectroscopy with graphite furnace.

Figure 8:
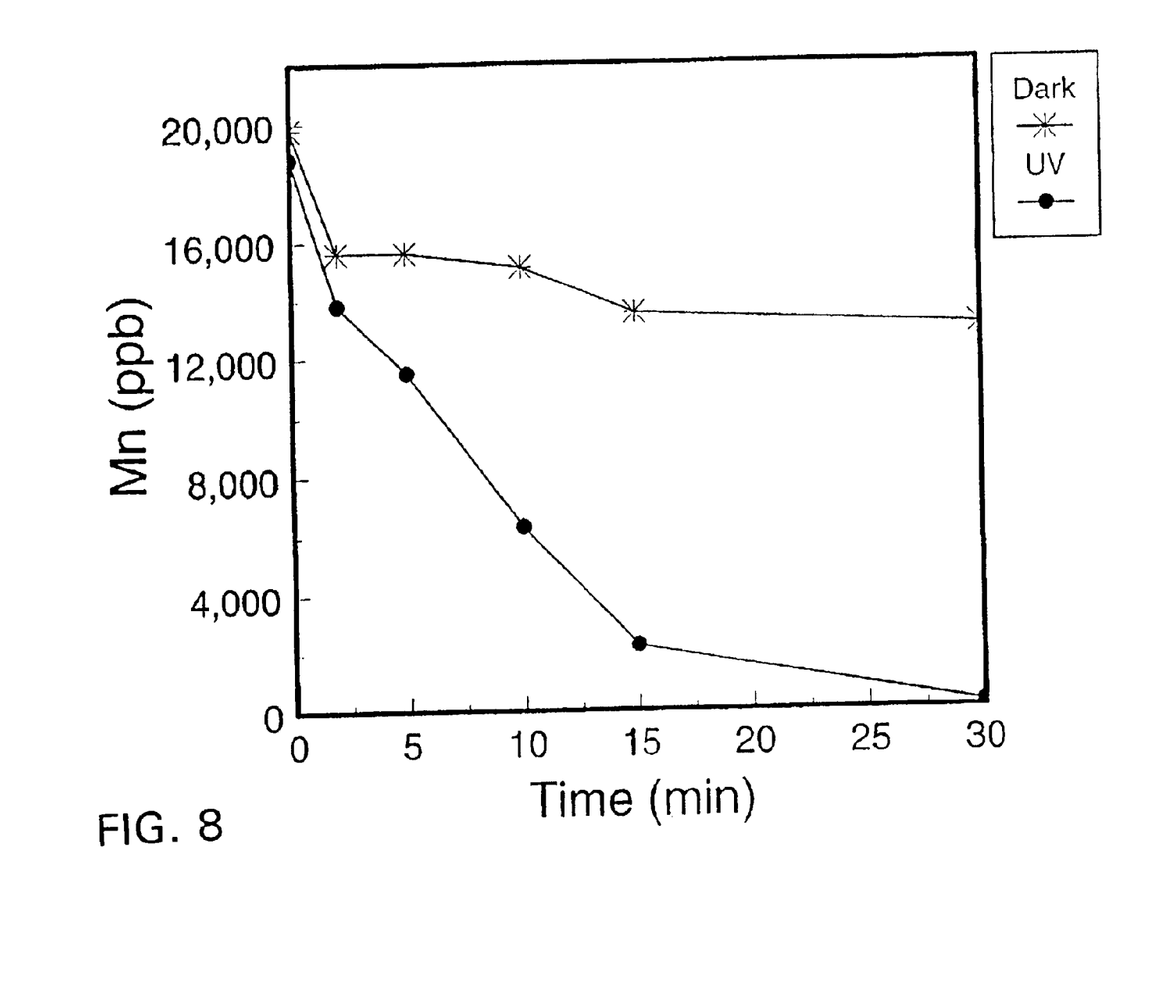
FIG. 8 is a graph that plots residual manganese concentrations as a function of elapsed time when a solution (1.7L) containing manganese(II) at a concentration of about 20 mg/L, at pH 9.5, was illuminated with a 15 W 254 nm lamp. Sodium sulphite solution was added at a dose rate of 80 mg/L/min and air was sparged at a rate of 2.5 L/min. Ferric chloride was added at 6.2 mg Fe/L to facilitate the manganese removal. Data with no UV illumination (dark) are also shown.

As shown in FIG. 7, at pH 8.5, the rate of removal of manganese from solution was accelerated by the illumination of the reaction mixture using UV light from a low-pressure mercury lamp. The oxidation of a more concentrated solution of Mn(II) at pH 9.5 is depicted in FIG. 8. Here, the dosing rate of sulphite was increased to 80 mg/L/min to account for the initial Mn(II) concentration of 20 mg/L.

Photo-Oxidation of Dissolved Iron(II) in Acid Conditions

The oxidation of iron(II) was followed by periodically measuring the residual dissolved iron(II) concentration in the reaction mixture. This was determined spectrophotometrically using ferrozine reagent (Stookey, Analytical Chemistry, Vol. 42, No. 7, 1970).

Figure 9:
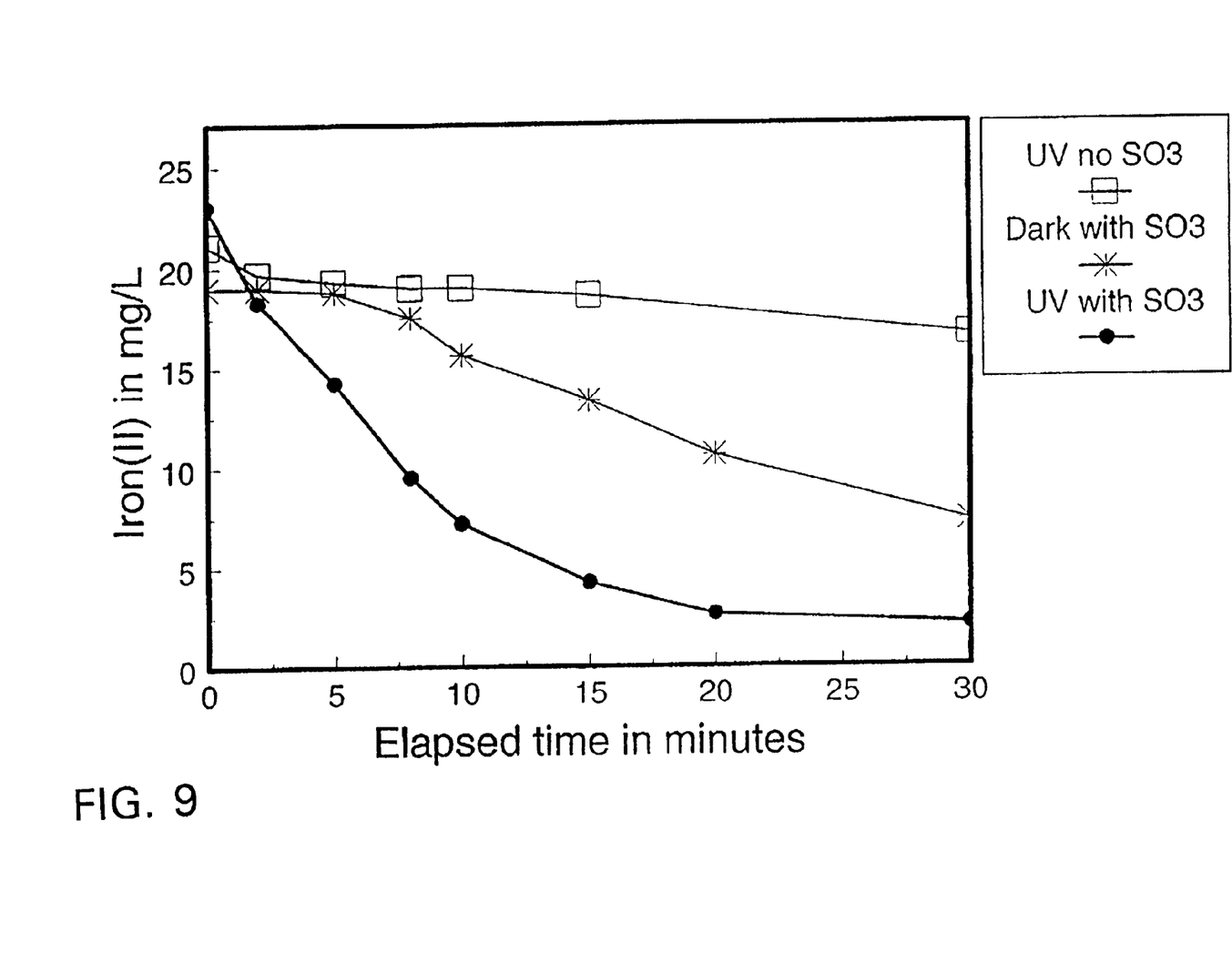
FIG. 9 is a graph that plots iron(II) concentrations as a function of elapsed time when a solution (1.7L) containing iron(II) at a concentration of about 20 mg/L, at pH 2, was illuminated with a 15 W 254 nm lamp. Sodium sulphite solution was added at a dose rate of 20 mg/L/min, air was sparged at a rate of 2.5 L/min. Data with UV without sulphite, and no UV illumination (dark) are also shown.

FIG. 9 shows iron(II) concentrations as a function of elapsed time when a solution (1.7L) containing iron(II) at a concentration of about 20 mg/L, at pH2, was illuminated with a 15 W 254 nm lamp. Sodium sulphite solution was added at a dose rate of 20 mg/L/min, air was sparged at a rate of 2.5 L/min. The oxidation data with UV illumination but without sulphite indicated that the oxidation of Fe(II) by dissolved oxygen was accelerated by UV illumination. This was due to the fact that dissolved Fe(II), which is a mild photo-absorber of light at 254 nm wavelength, photo-initiated and sustained the oxidation reaction. Dissolved Fe(II) was oxidised in the presence of dissolved sulphite and oxygen without UV illumination (dark) (known as the auto-oxidation reaction).

Photo-Oxidation of Cerium(III)

The oxidation of cerium(III) was followed by measuring the concentration of cerium(IV) in solution using a volumetric titration method (Vogel A. I. 'A text-book of quantitative inorganic analysis' third edition, Longmans 1961, page 318). Data from the three test runs, with UV illumination and sulphite dosing, with UV illumination but without sulphite dosing, and without UV illumination but with sulphite dosing are given in FIG. 10.

Figure 10:
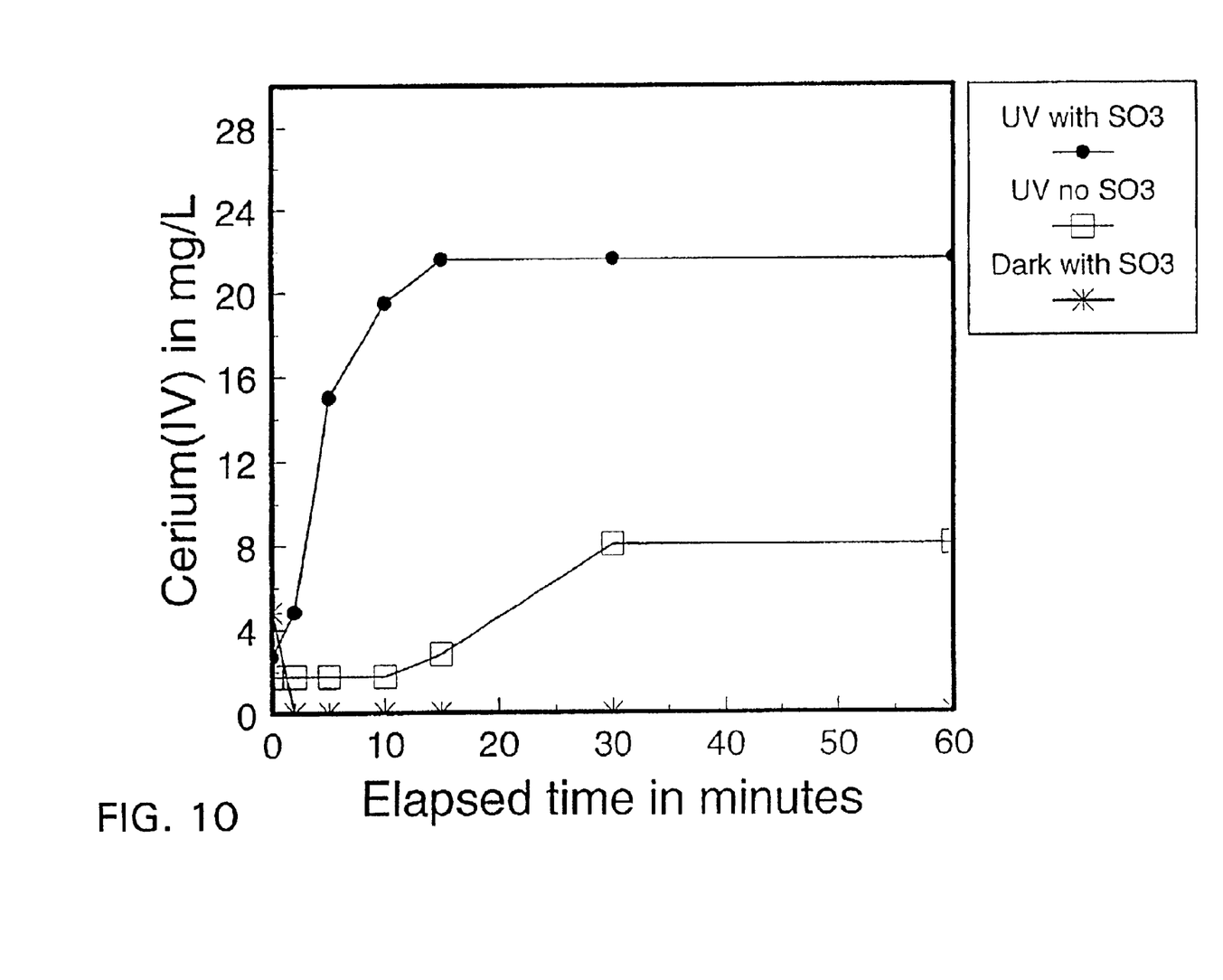
FIG. 10 is a graph that plots cerium(IV) concentrations as a function of elapsed time when a solution (1.7L) containing cerium(III) at a concentration of 20 mg/L, at pH 6.5, was illuminated with a 15 W 254 nm lamp. Sodium sulphite solution was added at a dose rate of 20 mg/L/min, air was sparged at a rate of 2.5 L/min. Data with UV illumination but without sulphite, and no UV illumination (dark) are also shown.

As shown in FIG. 10, unlike the case for iron(II), the auto-oxidation reaction (in the dark) was not sufficient to oxidise dissolved cerium(III). However, like iron(II), dissolved cerium(III) absorbed UV light at 254 nm and photo-initiated the oxidation reaction. The photo-oxidation reaction was clearly accelerated by the addition of 20 mg/L of sulphite per minute.

Whilst the invention has been described with reference to a number of preferred embodiments it should be appreciated that the invention can be embodied in many other forms.

What is claimed is:

1. A method for oxidizing selenium, vanadium, nickle, arsenic, manganese, cerium or uranium in an aqueous solution comprising the steps of:

(i) supplying an oxidizable source of sulphur as a photoabsorber, and oxygen to the solution; and (ii) irradiating the solution with UV light such that the selenium, vanadium, nickle, arsenic, manganese, cerium or uranium is oxidized.

2. The method as claimed in claim 1, wherein the oxidizable source of sulphur is chosen from the group consisting of one or more of $SO_3^{2-}$, $SO_2(g)$, aqueous $SiO_2$, $HSO_3^-$, $S_2O_3^{2-}$ and $S_4O_6^{2-}$.

3. The method as claimed in claim 1, wherein the inorganic species is present in the aqueous solution in trace quantities.

4. The method as claimed in claim 1, wherein the wavelength of UV light is less than 300 nm.

5. The method as claimed in claim 1, wherein the oxygen supplied to the solution is derived from air.

6. The method as claimed in claim 1, wherein the oxygen supplied to the solution has a partial pressure of about 0.2 atmospheres.

7. The method as claimed in claim 1, wherein the aqueous solution is one of: drinking water, industrial waste water, or an industrial process liquor.

8. A method of oxidizing at least one of selenium, vanadium, nickle, arsenic, manganese, cerium and uranium in an aqueous solution, the method comprising the steps of:

(i) supplying an oxidizable source of sulphur as a photo-absorber to the solution;

(ii) supplying oxygen to the solution; and (iii) irradiating the solution with UV light such that oxidation of at least one of the selenium, vanadium, nickle, arsenic, manganese, cerium and uranium occurs.

* * * * *